(12) United States Patent
Tomatsuri et al.

(10) Patent No.: US 7,350,510 B2
(45) Date of Patent: Apr. 1, 2008

(54) FUEL SUPPLY APPARATUS FOR INTERNAL COMBUSTION ENGINE

(75) Inventors: Mamoru Tomatsuri, Toyota (JP); Yukio Kobayashi, Kasugai (JP); Keita Fukui, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 79 days.

(21) Appl. No.: 11/384,309

(22) Filed: Mar. 21, 2006

(65) Prior Publication Data
US 2006/0231080 A1 Oct. 19, 2006

(30) Foreign Application Priority Data
Apr. 15, 2005 (JP) .............................. 2005-118440

(51) Int. Cl.
*F02M 33/02* (2006.01)
(52) U.S. Cl. ...................................... 123/514
(58) Field of Classification Search ................ 123/514, 123/516, 497, 467
See application file for complete search history.

(56) References Cited

U.S. PATENT DOCUMENTS

| 5,357,925 | A | | 10/1994 | Sasaki | |
|---|---|---|---|---|---|
| 5,373,829 | A | * | 12/1994 | Schuers et al. ............. | 123/510 |
| 5,598,817 | A | * | 2/1997 | Igarashi et al. ......... | 123/179.17 |
| 5,642,716 | A | * | 7/1997 | Ricco .......................... | 123/456 |
| RE36,119 | E | * | 3/1999 | Kunishima et al. ......... | 123/516 |
| 6,058,912 | A | | 5/2000 | Rembold et al. | |
| 6,474,310 | B2 | * | 11/2002 | Joos et al. .................... | 123/497 |
| 6,772,738 | B2 | * | 8/2004 | Rembold et al. ............ | 123/514 |
| 6,895,936 | B2 | * | 5/2005 | Kuroda ....................... | 123/446 |
| 2001/0009147 | A1 | | 7/2001 | Takashima et al. | |
| 2006/0048752 | A1 | * | 3/2006 | Stroia et al. ................ | 123/458 |

FOREIGN PATENT DOCUMENTS

| JP | A 08-028382 | 1/1996 |
|---|---|---|
| JP | A 08-061175 | 3/1996 |
| JP | A 10-122099 | 5/1998 |
| JP | A 11-044236 | 2/1999 |
| JP | A 2003-074441 | 3/2003 |

* cited by examiner

*Primary Examiner*—Thomas Moulis
(74) *Attorney, Agent, or Firm*—Oliff & Berridge, PLC

(57) ABSTRACT

The engine ECU executes a program including the step of determining whether there is a possibility of occurrence of air bubbles within the high-pressure delivery pipe when there is an engine start request, the step of transmitting an open-instruction signal to the electromagnetic relief valve when there is a possibility of occurrence of air bubbles, the step of transmitting a drive-instruction signal to the feed pump, the step of transmitting a close-instruction signal to the electromagnetic relief valve after the feed pump is driven for a predetermined period of time, the step of transmitting a drive-instruction signal to the starter, and the step of transmitting an injection-instruction signal to the EDU.

20 Claims, 7 Drawing Sheets

FUEL SUPPLY APPARATUS FOR INTERNAL COMBUSTION ENGINE

This nonprovisional application is based on Japanese Patent Application No. 2005-118440 filed with the Japan Patent Office on Apr. 15, 2005, the entire contents of which are hereby incorporated by reference.

BACKGROUND OF THE INVENTION

1. Field of the Invention

The present invention relates to a fuel supply apparatus for an internal combustion engine having a fuel injection mechanism (in-cylinder injector) for injecting fuel into a cylinder at a high pressure, or for an internal combustion engine having, in addition to the above fuel injection mechanism, another fuel injection mechanism (intake manifold injector) for injecting fuel into an intake manifold or an intake port. More particularly, the present invention relates to a fuel supply apparatus for an internal combustion engine capable of preventing leakage of fuel from a high-pressure fuel system at the time of stop of the internal combustion engine and also capable of appropriately handling vapor generated within a fuel pipe.

2. Description of the Background Art

Generally, in an engine for an automobile, fuel is supplied from a fuel tank via a fuel pump and a fuel pipe to an engine (internal combustion engine), where the fuel is injected via an injector.

A direct injection engine having an in-cylinder injector for injecting fuel into a combustion chamber of a gasoline engine is known. Further, an engine having an in-cylinder injector for injecting fuel into a combustion chamber of a gasoline engine and an intake manifold injector for injecting fuel into an intake manifold, and performing fuel injection using both of the in-cylinder injector and the intake manifold injector in accordance with the engine speed or the load of the internal combustion engine is also known. In a high-pressure fuel system including the in-cylinder injector, the fuel having a fuel pressure increased by a high-pressure fuel pump is supplied via a delivery pipe to the in-cylinder injector, and the in-cylinder injector injects the high-pressure fuel into a combustion chamber of a corresponding cylinder in the internal combustion engine.

As such, a high-pressure fuel pump is used to make the fuel attain a high-pressure state in the internal combustion engine. In the high-pressure fuel pump, a cylinder is driven by means of a cam that is provided at a driveshaft connected to a crankshaft of the internal combustion engine.

In the internal combustion engine as described above, in order to improve restarting capability at a high temperature at the time of engine start, it is necessary to prevent occurrence of vapor in the fuel within the fuel pipe. Thus, in a conventional fuel injection control apparatus for an internal combustion engine, a check valve is provided at the discharge side of the fuel pump, and the fuel residual pressure within the fuel pipe is not lowered even while the engine is stopped, so as to maintain a high fuel pressure.

When the fuel pressure within the fuel pipe is maintained at a high pressure while the engine is stopped, however, there may occur leakage of the fuel from the injector into the intake pipe. The fuel pressure maintained at a high pressure during the time of engine stop is decreased to a level equivalent to the atmospheric pressure (=0.1 [MPa]) in about 60 minutes, during which the gasoline would leak in a quantity as large as about 20 mcc per fuel pipe.

Such fuel leakage causes an increase of unburned HC within the exhaust gas at the time of next engine start. The amount of HC emission at the time of start becomes very large within the time of about one second. Further, the quantity of the fuel leaked from the injector cannot be controlled, thus causing variation in exhaust gas components at the time of engine start.

Furthermore, the fuel leaked into the intake pipe may increase the fuel vapor gas emitted from the automobile. The situation is approaching an intolerable level, with the exhaust gas regulations having become increasingly stringent in recent years.

Japanese Patent Laying-Open No. 08-028382 discloses a fuel pressure control apparatus of a high-pressure injection type engine, that can control the high-pressure state of the fuel line in a stable state where no vapor occurs during the engine operation, and that can surely lower the pressure of the fuel line close to the atmospheric pressure level after the stop of the engine. This fuel pressure control apparatus of a high-pressure injection type engine is provided with a fuel pump for high pressure on a fuel line, and is also provided with a pressure regulator for high pressure that is arranged downstream of the fuel pump for high pressure. A high-pressure line is arranged between the fuel pump for high pressure and the pressure regulator for high pressure, a low-pressure delivery line is arranged from the fuel tank to the upstream of the fuel pump for high pressure, and a low-pressure return line is arranged from the downstream of the pressure regulator for high pressure to the fuel tank. An injector for injecting fuel directly into a combustion chamber is connected to the high-pressure line. In the high-pressure injection type engine configured as described above, the pressure regulator for high pressure is of a constantly open type, which is in an open state when the engine is stopped. On the low-pressure return line arranged downstream of the pressure regulator for high pressure, a mechanical type pressure regulator for low pressure and a constantly open type valve that is closed at the time of engine operation, are arranged in parallel.

According to this fuel pressure control apparatus for a high-pressure injection type engine, the fuel pump for high pressure operates during the engine operation, to narrow down the pressure regulator for high pressure arranged downstream of the fuel pump for high pressure on the fuel line, so as to adjust the fuel pressure. Thus, the fuel pressure in the high-pressure line between the fuel pump for high pressure and the constantly open type pressure regulator for high pressure is maintained at a high pressure. The constantly open type valve connected in parallel with the mechanical type pressure regulator for low pressure, which are arranged on the low-pressure return line connecting the downstream side of the pressure regulator for high pressure and the fuel tank, is maintained at a closed state during the engine operation. Thus, the relief fuel from the pressure regulator for high pressure has its pressure adjusted by the mechanical type pressure regulator for low pressure, and the fuel is returned to the fuel tank while the fuel pressure is gradually reduced instead of being rapidly reduced. Meanwhile, when the engine is stopped with the ignition switch OFF, the constantly open type pressure regulator for high pressure is opened, and the constantly open type valve is opened. As a result, the fuel pressure on the high-pressure line is released to the fuel tank from the constantly open type pressure regulator for high pressure via the constantly open type valve. In this manner, the pressure regulator for high pressure is opened when the engine is stopped, and the fuel pressure on the high-pressure line is surely reduced close to the level of the atmospheric pressure, and accordingly, leakage of the fuel from the injector in communication with the high-pressure line can be prevented.

When the fuel pressure of the high-pressure line is decreased after the engine stop as described in Japanese Patent Laying-Open No. 08-028382, however, the following problem will arise. Since the fuel pressure during the engine operation is very high, the decrease of the fuel pressure will cause boiling under reduced pressure, so that the air may be generated within the delivery pipe. The air may enter the delivery pipe from the gap of the relief valve as well. If the air thus occurred in the delivery pipe is injected from the injector into the combustion chamber, the air-fuel ratio may be disturbed (to the lean side) at the time of next start of the internal combustion engine. The extremely lean state may even cause misfire.

SUMMARY OF THE INVENTION

An object of the present invention is to provide a fuel supply apparatus for an internal combustion engine having a fuel injection mechanism, capable of preventing leakage of the fuel from the fuel injection mechanism during the stop of the internal combustion engine, and also capable of appropriately handling vapor generated in a fuel pipe.

A fuel supply apparatus for an internal combustion engine according to the present invention includes: a high-pressure fuel pump driven by the internal combustion engine and for pressurizing fuel supplied from a fuel tank by a low-pressure fuel pump; a delivery pipe for supplying the fuel from the high-pressure fuel pump to a fuel injection mechanism; a relief valve switched between a communicating state where the delivery pipe is communicated with the fuel tank and a non-communicating state where the delivery pipe is not communicated with the fuel tank; and a control portion for controlling the relief valve. The control portion switches the relief valve to the communicating state at the time of stop of the internal combustion engine, and switches the relief valve to the communicating state and drives a fuel pump, before fuel injection by the fuel injection mechanism, when a predetermined condition for a state in the delivery pipe is satisfied.

According to the invention, at the time of stop of the internal combustion engine, the relief valve is opened to make the delivery pipe communicate with the fuel tank (normal pressure) to lower the fuel pressure, to thereby avoid leakage of the fuel from the fuel injection mechanism (particularly the fuel injection mechanism directly injecting fuel into the cylinder). At this time, for example at the time of a high temperature, vapor may be generated due to boiling under reduced pressure. When there is a request of restart of the internal combustion engine in such a state, the fuel pump is used to transfer the vapor within the delivery pipe to the fuel tank while the relief valve is in an open state before starting (before cranking). This can prevent the vapor from being emitted from the fuel injection mechanism at the start of the internal combustion engine, which would otherwise cause a lean air-fuel ratio. As a result, it is possible to provide a fuel supply apparatus for an internal combustion engine having a fuel injection mechanism, that can suppress leakage of the fuel from the fuel injection mechanism at the time of stop of the internal combustion engine, and that can appropriately handle the vapor generated within the fuel pipe.

Preferably, the predetermined condition is that occurrence of vapor within the delivery pipe is expected.

According to the invention, when it is expected that vapor will be generated within the delivery pipe at the time of a high temperature due to boiling under reduce pressure, the fuel pump can be used to transfer the vapor within the delivery pipe to the fuel tank with the relief valve being opened before starting (before cranking). This can prevent the vapor from being emitted from the fuel injection mechanism at the start of the internal combustion engine to cause a lean air-fuel ratio.

More preferably, the occurrence of vapor within the delivery pipe is expected when a temperature of the fuel is high and when the relief valve is switched to the communicating state at the time of stop of the internal combustion engine.

When a temperature of the fuel is high and when the relief valve is switched to the communicating state at the time of stop of the internal combustion engine, there is a high possibility that vapor would be generated due to boiling under reduced pressure. According to the invention, when such occurrence of vapor is expected, the fuel pump is used to transfer the vapor within the delivery pipe to the fuel tank with the relief valve being opened before starting (before cranking). Accordingly, the vapor is prevented from being emitted from the fuel injection mechanism at the time of start of the internal combustion engine, which would otherwise cause a lean air-fuel ratio.

More preferably, the occurrence of vapor within the delivery pipe is expected when a temperature of the internal combustion engine is high and when the internal combustion engine is restarted after the relief valve is switched to the communicating state at the time of stop of the internal combustion engine.

When a temperature of the internal combustion engine is high and when the internal combustion engine is restarted after the relief valve is switched to the communicating state at the time of stop of the internal combustion engine, there is a high possibility that vapor would be generated due to boiling under reduced pressure. According to the invention, when such occurrence of vapor is expected, the fuel pump is used to transfer the vapor within the delivery pipe to the fuel tank with the relief valve being opened before starting (before cranking). Accordingly, the vapor is prevented from being emitted from the fuel injection mechanism at the time of start of the internal combustion engine to cause a lean air-fuel ratio.

Preferably, the fuel pump controlled by the control portion is the low-pressure fuel pump.

According to the invention, the low-pressure pump (feed pump) delivering the fuel from the fuel tank to the high-pressure pump can be used to transfer the vapor within the delivery pipe to the fuel tank, so as to prevent the vapor from being emitted from the fuel injection mechanism at the time of start of the internal combustion engine, which would otherwise cause a lean air-fuel ratio.

More preferably, the fuel pump controlled by the control portion is the high-pressure fuel pump.

According to the invention, the high-pressure pump driven by the cam provided at the camshaft of the internal combustion engine can be used to transfer the vapor within the delivery pipe to the fuel tank, so as to prevent the vapor from being emitted from the fuel injection mechanism at the time of start of the internal combustion engine to cause a lean air-fuel ratio.

Preferably, the fuel supply apparatus according to the present invention is applied to an internal combustion engine having a fuel injection mechanism for injecting fuel into a cylinder.

A fuel supplied to the fuel injection mechanism (in-cylinder injector) injecting fuel into a cylinder has a very high fuel pressure (about 14 [MPa]). Thus, according to the invention, at the time of stop of the internal combustion engine, the relief valve is opened to make the delivery pipe communicate with the fuel tank to lower the fuel pressure to the level of the atmospheric pressure. This can prevent leakage of the fuel at the time of stop of the internal combustion engine.

More preferably, the fuel supply apparatus according to the present invention is applied to an internal combustion engine having a fuel injection mechanism for injecting fuel into a cylinder and a fuel injection mechanism for injecting fuel into an intake manifold.

According to the invention, it is possible to prevent leakage of the fuel from the fuel injection mechanism (in-cylinder injector) injecting fuel into the cylinder at the time of stop of the internal combustion engine.

More preferably, the fuel supply apparatus according to the present invention is applied to an internal combustion engine that is mounted to a vehicle and operated intermittently during driving of the vehicle.

In a hybrid vehicle incorporating an engine and a motor generator, for example, the engine is operated intermittently (e.g., the vehicle is driven by the engine in the operation region where the engine is more efficient, while the vehicle is driven by the motor generator in the other operation region, thus making the engine operated intermittently), and the engine restart is conducted when the engine is at a high temperature. According to the invention, in the engine mounted to such a vehicle, leakage of the fuel at the time of engine stop is prevented, and vapor generated by boiling under reduced pressure can be handled appropriately.

More preferably, the fuel supply apparatus according to the present invention is applied to an internal combustion engine mounted to a vehicle that is driven by a rotary electric machine when there is a drive request while the control portion is controlling the fuel pump.

According to the invention, in a hybrid vehicle, the vehicle can be driven by the motor generator when there is a drive request while the vapor is being processed within the delivery pipe (i.e., while the engine cannot be started).

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
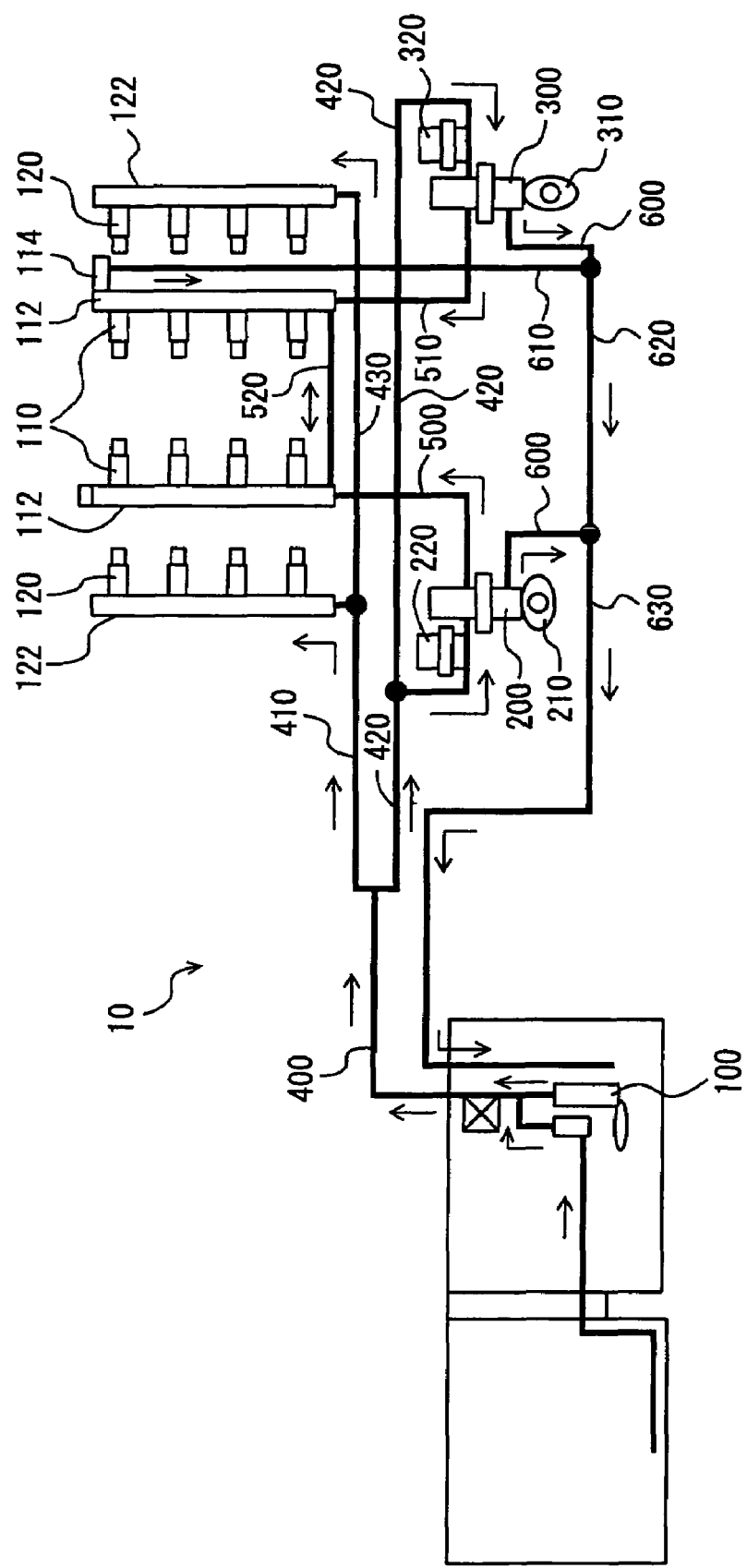
FIG. 1 is an overall schematic view of a fuel supply system for a gasoline engine, which is controlled by control apparatuses according to first through fourth embodiments of the present invention.

Hereinafter, embodiments of the present invention will be described with reference to the drawings. In the following, the same portions have the same reference characters allotted, and have the same names and functions. Therefore, detailed description thereof will not be repeated where appropriate.

Figure 2:
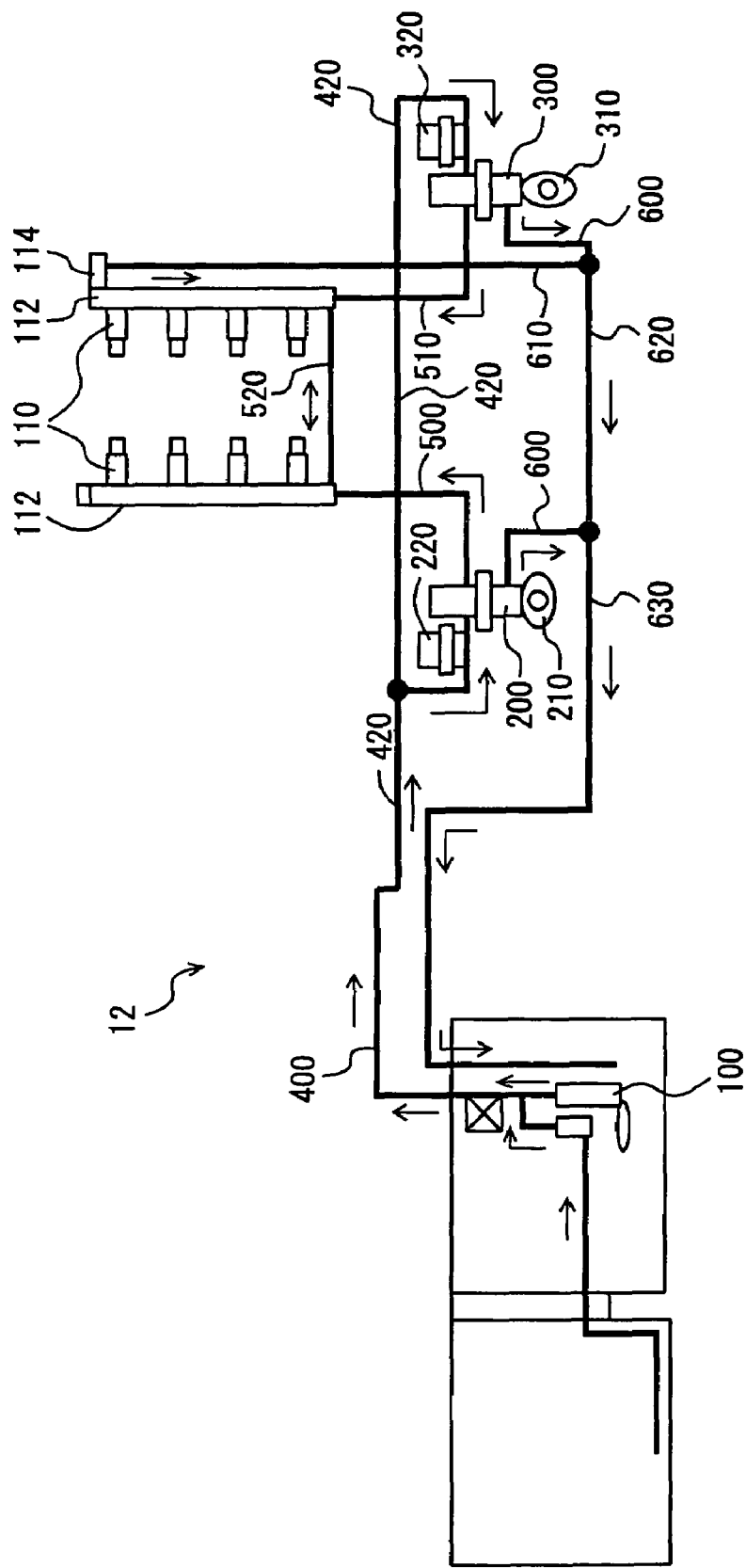
FIG. 2 is an overall schematic view of a fuel supply system for another gasoline engine, which is controlled by the control apparatuses according to the first through fourth embodiments of the present invention.
Figure 3:
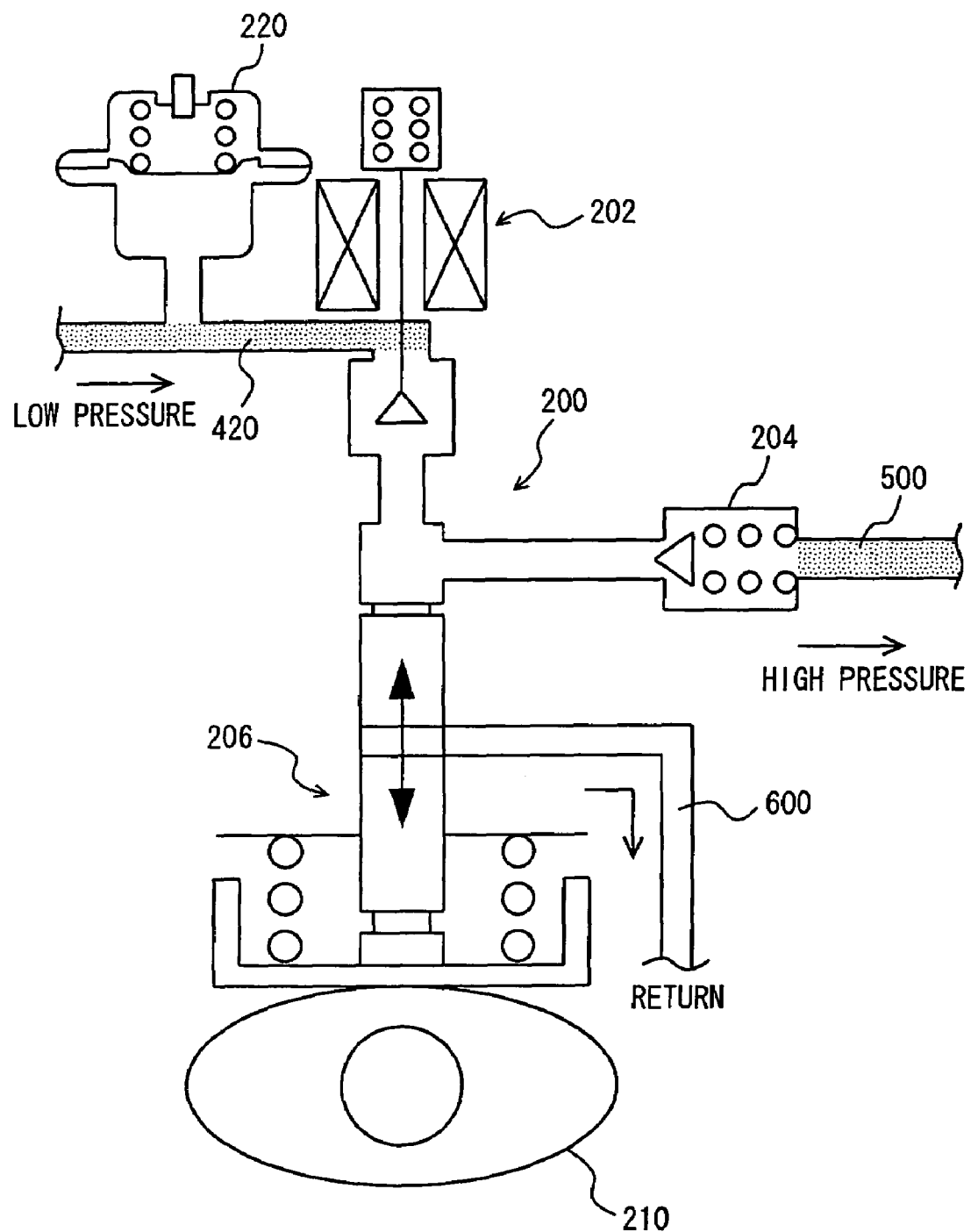
FIG. 3 is a partial enlarged view of FIGS. 1 and 2.

Referring to FIGS. 1-3, a fuel supply system for an engine common to the first through fourth embodiments of the present invention will be described.

FIG. 1 shows a fuel supply system 10 for an engine according to the embodiment of the present invention. This engine is a V-type 8-cylinder gasoline engine, which has an in-cylinder injector 110 for injecting fuel into a corresponding cylinder, and an intake manifold injector 120 for injecting fuel into an intake manifold of the corresponding cylinder. It is noted that the present invention is applicable not only to such an engine, but also to a gasoline engine of another type at least having in-cylinder injectors 110 (engine shown in FIG. 2 as will be explained later), and to a common-rail type diesel engine. Further, the number of high-pressure fuel pumps is not restricted to two. Furthermore, the engine type is not restricted to the V-type 8-cylinder type, but may be any of V-type 6-cylinder type, in-line 4-cylinder type, in-line 6-cylinder type, and the like. Still further, the shape of the cam driving the high-pressure fuel pump is not restricted to the one explained below (i.e., it changes in accordance with the number of cylinders).

As shown in FIG. 1, this fuel supply system 10 includes a feed pump 100 provided in a fuel tank and for supplying fuel at a discharge pressure of low pressure (about 400 kPa corresponding to the pressure of a pressure regulator), a first high-pressure fuel pump 200 driven by a first cam 210, a second high-pressure fuel pump 300 driven by a second cam 310 having a discharge phase different from that of first cam 210, a high-pressure delivery pipe 112 provided for each of left and right banks and for supplying fuel of a high pressure to in-cylinder injectors 110, four in-cylinder injectors 110 for each of the left and right banks, provided at the corresponding high-pressure delivery pipe 112, a low-pressure delivery pipe 122 provided for each of the left and right banks and for supplying fuel to intake manifold injectors 120, and four intake manifold injectors 120 for each of the left and right banks, provided at the corresponding low-pressure delivery pipe 122.

The discharge port of feed pump 100 in the fuel tank is connected to a low-pressure supply pipe 400, which is branched into a first low-pressure delivery connection pipe 410 and a pump supply pipe 420. First low-pressure delivery connection pipe 410 is branched to low-pressure delivery pipe 122 of one of the V-shaped banks, and on the downstream of that branch point, it forms a second low-pressure delivery connection pipe 430, which is connected to low-pressure delivery pipe 122 of the other bank.

Pump supply pipe 420 is connected to intake ports of first and second high-pressure fuel pumps 200 and 300. A first pulsation damper 220 and a second pulsation damper 320 are provided immediately upstream of the intake ports of first and second high-pressure fuel pumps 200 and 300, respectively, so as to reduce fuel pulsation.

The discharge port of first high-pressure fuel pump 200 is connected to a first high-pressure delivery connection pipe 500, which is connected to high-pressure delivery pipe 112 of one of the V-shaped banks. The discharge port of second high-pressure fuel pump 300 is connected to a second high-pressure delivery connection pipe 510, which is connected to high-pressure delivery pipe 112 of the other bank. High-pressure delivery pipe 112 of one bank and high-pressure delivery pipe 112 of the other bank are connected via a high-pressure connection pipe 520.

An electromagnetic relief valve 114 provided at high-pressure delivery pipe 112 is connected via a high-pressure delivery return pipe 610 to a high-pressure fuel pump return pipe 600. The return ports of high-pressure fuel pumps 200 and 300 are connected to high-pressure fuel pump return pipe 600. High-pressure fuel pump return pipe 600 is connected to return pipes 620 and 630, and then connected to the fuel tank.

FIG. 2 shows a fuel supply system 12 of another engine according to an embodiment of the present invention. The fuel supply system 12 shown in FIG. 2 has in-cylinder injectors 110 of fuel supply system 10 of the engine shown in FIG. 1, but does not have intake manifold injectors 120. In fuel supply system 12 of the engine shown in FIG. 2, the components having the same functions as those in fuel supply system 10 of the engine shown in FIG. 1 have the same reference characters and names, and detailed description thereof will not be repeated. It is noted that the type of the engine shown in FIG. 2 is not restricted to the V-type 8-cylinder type, but may be V-type 6-cylinder type, in-line 4-cylinder type, in-line 6-cylinder type and the like, as in the case of the engine shown in FIG. 1. Further, the shape of the cam driving the high-pressure fuel pump is not restricted to the shape as described below (i.e., it depends on the number of cylinders).

FIG. 3 is an enlarged view of first high-pressure fuel pump 200 and its surroundings in FIGS. 1 and 2. Although second high-pressure fuel pump 300 has the similar configuration, they are different in phase of the cams and hence different in phase of the discharge timings, thereby suppressing occurrence of pulsation. First and second high-pressure fuel pumps 200 and 300 may have characteristics similar to or different from each other.

High-pressure fuel pump 200 has, as its main components, a pump plunger 206 driven by a cam 210 to slide up and down, an electromagnetic spill valve 202, and a check valve 204 provided with a leakage function.

When pump plunger 206 is moved downward by cam 210 and while electromagnetic spill valve 202 is open, the fuel is introduced (suctioned). When pump plunger 206 is moved upward by cam 210, the timing to close electromagnetic spill valve 202 is changed to control the quantity of the fuel discharged from high-pressure fuel pump 200. During the pressurizing stroke in which pump plunger 206 is moved upward, the fuel of a greater quantity is discharged as the timing to close electromagnetic spill valve 202 is earlier, whereas the fuel of a fewer quantity is discharged as the timing to close the valve is later. The drive duty of electromagnetic spill valve 202 when the greatest quantity of fuel is discharged is set to 100%, and the drive duty of electromagnetic spill valve 202 when the smallest quantity of fuel is discharged is set to 0%. When the drive duty is 0%, electromagnetic spill valve 202 remains open, in which case, although pump plunger 206 slides up and down as long as first cam 210 continues to rotate (along with rotation of the engine), the fuel is not pressurized because electromagnetic spill valve 202 does not close.

The pressurized fuel presses and opens check valve 204 provided with the leakage function (of the set pressure of about 60 kPa), and the fuel is delivered via first high-pressure delivery connection pipe 500 to high-pressure delivery pipe 112. At this time, the fuel pressure is controlled in a feedback manner by a fuel pressure sensor provided at high-pressure delivery pipe 112. High-pressure delivery pipes 112 at the respective banks are in communication with each other via high-pressure connection pipe 520, as described above.

In the fuel supply apparatus according to the present embodiment, at the time of engine stop, an engine ECU (Electronic Control Unit) opens electromagnetic relief valve 114 provided at high-pressure delivery pipe 112, to make high-pressure delivery pipe 112 communicate with the fuel tank so as to reduce the fuel pressure. This can prevent leakage of the fuel from in-cylinder injector 110. When the fuel pressure within high-pressure delivery pipe 112 is reduced, boiling under reduced pressure will occur, which will cause generation of the air or vapor containing vaporized fuel components in the air (hereinafter, the air and the vapor will collectively be referred to as "air bubbles"). The engine ECU identified as the control apparatus according to the embodiment of the present invention can handle the air bubbles appropriately.

Hereinafter, control apparatuses according to the first through fourth embodiments will be described. The first through fourth embodiments differ from each other in the control structure of the program that is to be executed by the engine ECU implementing the control apparatus.

First Embodiment

The engine ECU as the control apparatus according to the present embodiment is characterized in that, when there is a possibility of occurrence of air bubbles in high-pressure delivery pipe 112, electromagnetic relief valve 114 is opened, and feed pump 100 is actuated for a prescribed period of time, before starting the engine.

Figure 4:
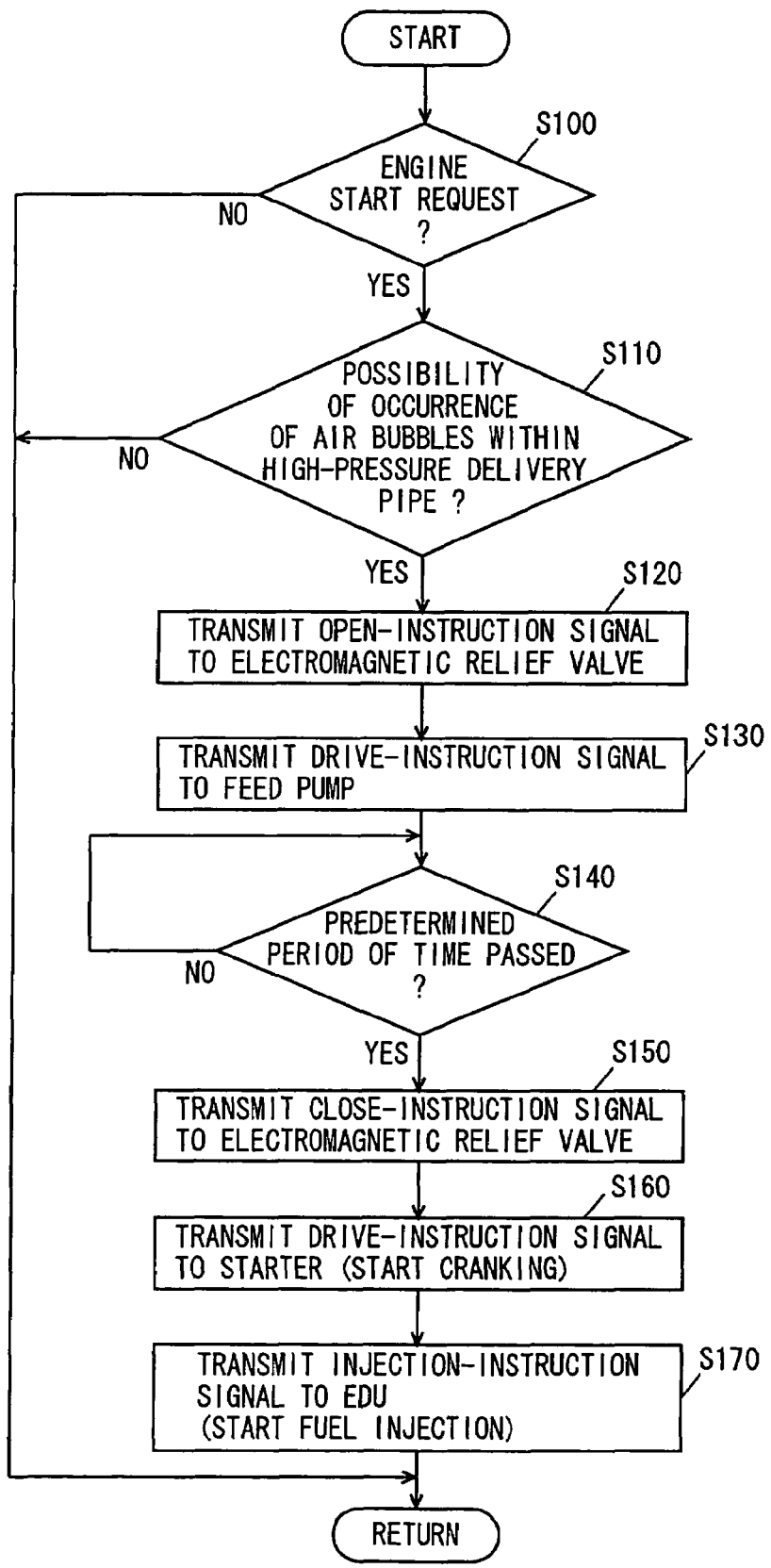
FIG. 4 is a flowchart illustrating a control structure of a program that is executed by the control apparatus according to the first embodiment of the present invention.

Hereinafter, a control structure of a program to be executed by the engine ECU will be described with reference to FIG. 4. It is noted that the vehicle incorporating this engine ECU has the engine alone as its driving source.

In step (hereinafter, abbreviated as "S") 100, the engine ECU determines whether there is an engine start request. At this time, the engine ECU determines that there is the engine start request when the ignition switch is turned to the engine start position, or when the push type engine start button is depressed. If it is determined that there is an engine start request (YES in S100), the process goes to S110. If not (NO in S100), the process is terminated.

In S110, the engine ECU determines whether there is a possibility of occurrence of air bubbles within high-pressure delivery pipe 112. Before the restart of the engine in the case where the ignition switch was turned off after the engine was warmed up to a high temperature and electromagnetic relief valve 114 was opened to reduce the pressure within the high-pressure delivery pipe, or before the restart of the engine in the case where the engine was intermittently stopped while the engine temperature is high, the engine ECU determines that there is a high possibility that boiling under reduced pressure has occurred during the previous fuel injection, and thus, determines that there is a possibility of occurrence of air bubbles in high-pressure delivery pipe 112. If it is determined that there is a possibility of occurrence of air bubbles in high-pressure delivery pipe 112 (YES in S110), the process goes to S120. If not (NO in S110), the process is terminated.

In S120, the engine ECU transmits an open-instruction signal to electromagnetic relief valve 114.

In S130, the engine ECU transmits a drive-instruction signal to feed pump 100.

In S140, the engine ECU determines whether a predetermined period of time has passed since transmission of the drive-instruction signal to feed pump 100. If so (YES in S140), the process goes to S150. If not (NO in S140), the process is returned to S140, where it awaits until the predetermined period of time passes.

In S150, the engine ECU transmits a close-instruction signal to electromagnetic relief valve 114.

In S160, the engine ECU transmits a drive-instruction signal to a starter (starter motor). In response, the engine is cranked via a flywheel provided at the crankshaft.

In S170, the engine ECU transmits a fuel injection-instruction signal to an EDU (Electronic Driver Unit). As such, fuel injection from in-cylinder injector 110 is started.

Hereinafter, an operation of the engine controlled by the engine ECU implementing the control apparatus of the present embodiment based on the above-described structure and flowchart will be explained.

When the driver turns the ignition switch to the engine start position, it is determined that there is an engine start request (YES in S100), and determination is made as to whether there is a possibility of occurrence of air bubbles within high-pressure delivery pipe 112 (S110).

If it is determined that there is a possibility of occurrence of air bubbles within high-pressure delivery pipe 112 (YES in S110), the open-instruction signal is transmitted to electromagnetic relief valve 114 (S120), to make electromagnetic relief valve 114 in an open state. While the engine is stopped, electromagnetic relief valve 114 is opened at least temporarily, to make high-pressure delivery pipe 112 communicate with the fuel tank to thereby reduce the fuel pressure, so that leakage of the fuel from in-cylinder injector 110 is avoided. The process of S120 may be carried out for the confirmation sake, since electromagnetic relief valve 114 may be closed thereafter.

With electromagnetic relief valve 114 opened, the drive-instruction signal is transmitted to feed pump 100 (S130), to drive feed pump 100 for a predetermined period of time (which is set to a time period at least long enough to ensure that the air bubbles within high-pressure delivery pipe 112 are transferred by feed pump 100 to the fuel tank and thus disappear from within high-pressure delivery pipe 112).

After feed pump 100 is driven for the predetermined period of time with electromagnetic relief valve 114 opened (YES in S140), the close-instruction signal is transmitted to electromagnetic relief valve 114 (S150), and thus, electromagnetic relief valve 114 attains a closed state.

The drive-instruction signal is transmitted to the starter (S160), the engine is cranked, and at the same time, the fuel is injected from in-cylinder injector 110 to start the engine.

As described above, according to the engine ECU as the control apparatus of the present embodiment, at the time of engine stop, the electromagnetic relief valve is opened to make the high-pressure delivery pipe communicate with the fuel tank to lower the fuel pressure, to thereby prevent fuel leakage from the in-cylinder injector. At this time, particularly at the time of a high temperature, air bubbles may occur by boiling under reduced pressure. If the engine start is requested in such a state, the feed pump is used to transfer the air bubbles to the fuel tank with the electromagnetic relief valve being opened before cranking. This can prevent the air bubbles from being emitted from the in-cylinder injector at the time of engine start to cause a lean air-fuel ratio. As a result, in the engine having the in-cylinder injector directly injecting fuel into a cylinder, leakage of the fuel from the in-cylinder injector during the engine stop can be prevented, and the vapor generated within the fuel pipe can be handled appropriately.

Second Embodiment

The engine ECU as the control apparatus according to the present embodiment is characterized in that, when there is a possibility of occurrence of air bubbles in high-pressure delivery pipe 112, electromagnetic relief valve 114 is opened, and first and second high-pressure pumps 200 and 300 are actuated for a prescribed period of time while prohibiting fuel injection from in-cylinder injector 110, which is followed by start of the engine.

Figure 5:
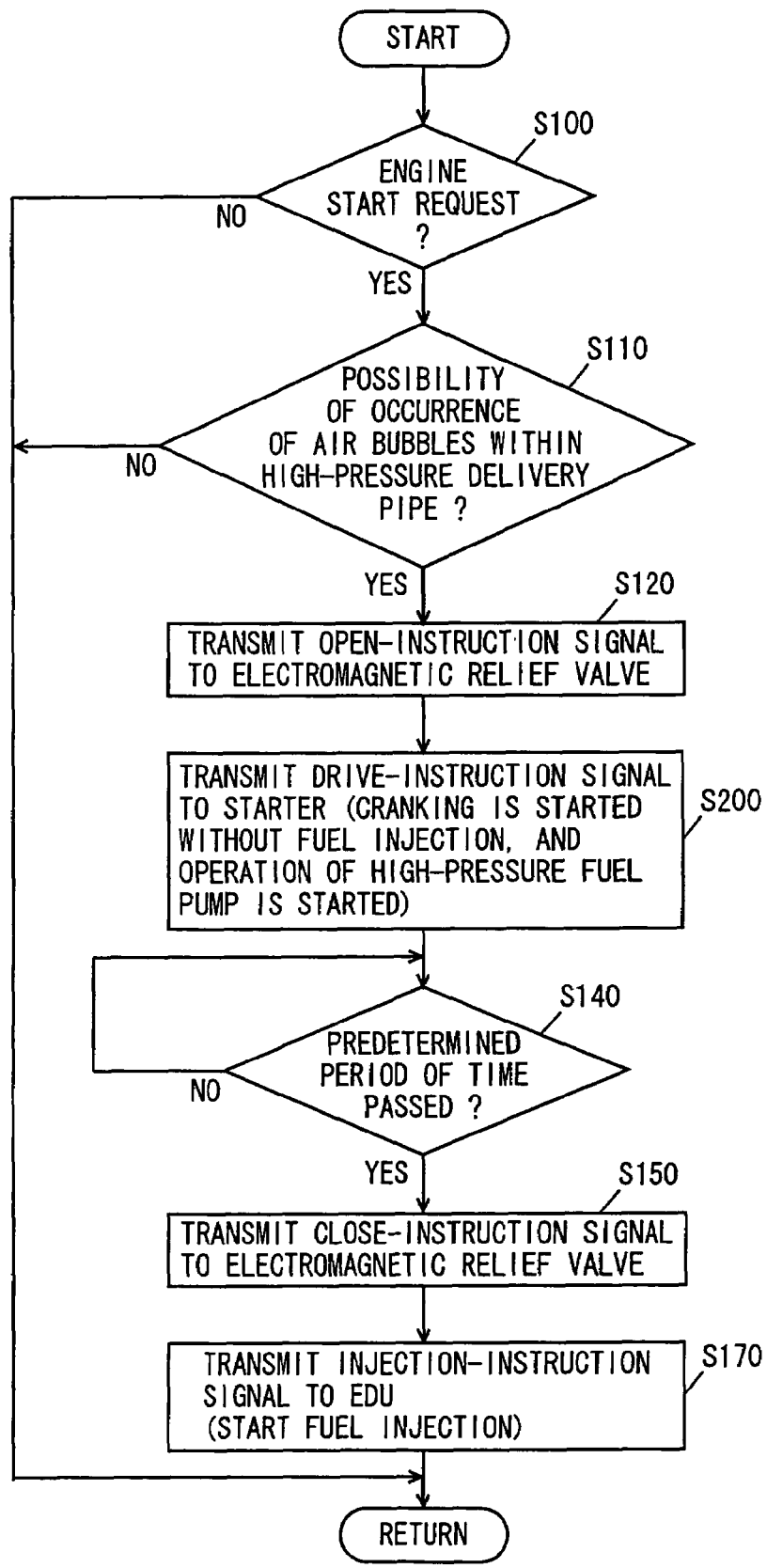
FIG. 5 is a flowchart illustrating a control structure of a program that is executed by the control apparatus according to the second embodiment of the present invention.

Hereinafter, a control structure of a program to be executed by the engine ECU will be described with reference to FIG. 5. The vehicle incorporating this engine ECU has the engine alone as its driving source. In the processes in the flowchart shown in FIG. 5, the same processes as in the flowchart in FIG. 4 have the same step numbers allotted, and have the same process contents. Thus, detailed description thereof will not be repeated here.

In S200, the engine ECU transmits a drive-instruction signal to the starter. At this time, the injection-instruction signal is not transmitted to the EDU, and thus, cranking is started without fuel injection from in-cylinder injector 110. As such, the cam 210 (310) shown in FIG. 3 begins to rotate, and first and second high-pressure pumps 200 and 300 are actuated. The drive duty of electromagnetic spill valve 202 at this time only needs to be a low fuel pressure (fuel discharge quantity) that allows the air bubbles within high-pressure delivery pipe 112 to be transferred by first and second high-pressure pumps 200 and 300 to the fuel tank to make the air bubbles disappear from high-pressure delivery pipe 112, since the fuel is not injected from in-cylinder injector 110.

Hereinafter, an operation of the engine controlled by the engine ECU implementing the control apparatus of the present embodiment based on the above-described structure and flowchart will be explained. Description of the contents of the operation identical to those of the embodiment described above will not be repeated here.

When it is determined that there is a possibility of occurrence of air bubbles within high-pressure delivery pipe 112 (YES in S110), an open-instruction signal is transmitted to electromagnetic relief valve 114 (S120), so that electromagnetic relief valve 114 attains an open state. With electromagnetic relief valve 114 opened, a drive-instruction signal is transmitted to the starter (S200), and first and second high-pressure pumps 200 and 300 are driven for a predetermined period of time (which is set to a length at least ensuring that the air bubbles within high-pressure delivery pipe 112 are transferred to the fuel tank by first and second high-pressure pumps 200 and 300, and thus, the air bubbles disappear from within high-pressure delivery pipe 112).

After first and second high-pressure pumps 200 and 300 are driven for the predetermined period of time with electromagnetic relief valve 114 opened (YES in S140), a close-instruction signal is transmitted to electromagnetic relief valve 114 (S150). After electromagnetic relief valve 114 is closed, the fuel is injected from in-cylinder injector 110 to start the engine.

As described above, according to the engine ECU as the control apparatus of the present embodiment, during the engine stop, the leakage of the fuel from the in-cylinder injector is avoided by opening the electromagnetic relief valve to make the high-pressure delivery pipe communicate with the fuel tank to thereby decreasing the fuel pressure. At this time, particularly at the time of a high temperature, air bubbles may occur by boiling under reduced pressure. If the engine start is requested in such a state, the electromagnetic relief valve is opened before cranking, and the engine is cranked without injecting the fuel, to transfer the air bubbles to the fuel tank by the high-pressure fuel pumps. This can prevent the air bubbles from being emitted from the in-cylinder injector at the engine start, and thus, can avoid the lean air-fuel ratio. As a result, in the engine having an in-cylinder injector directly injecting fuel into a cylinder, leakage of the fuel from the in-cylinder injector during the engine stop is prevented, and the vapor generated in the fuel pipe can be handled appropriately.

Third Embodiment

The engine ECU as the control apparatus according to the present embodiment is characterized in that, when there is a possibility of occurrence of air bubbles within high-pressure delivery pipe 112, electromagnetic relief valve 114 is opened, and feed pump 100 is actuated for a prescribed period of time before starting the engine, as in the first embodiment described above. The present embodiment differs from the first embodiment in that, when there is a vehicle drive request after an engine start request and before actual start of the engine, EV (Electric Vehicle) drive (by means of an electric motor) is carried out.

Figure 6:
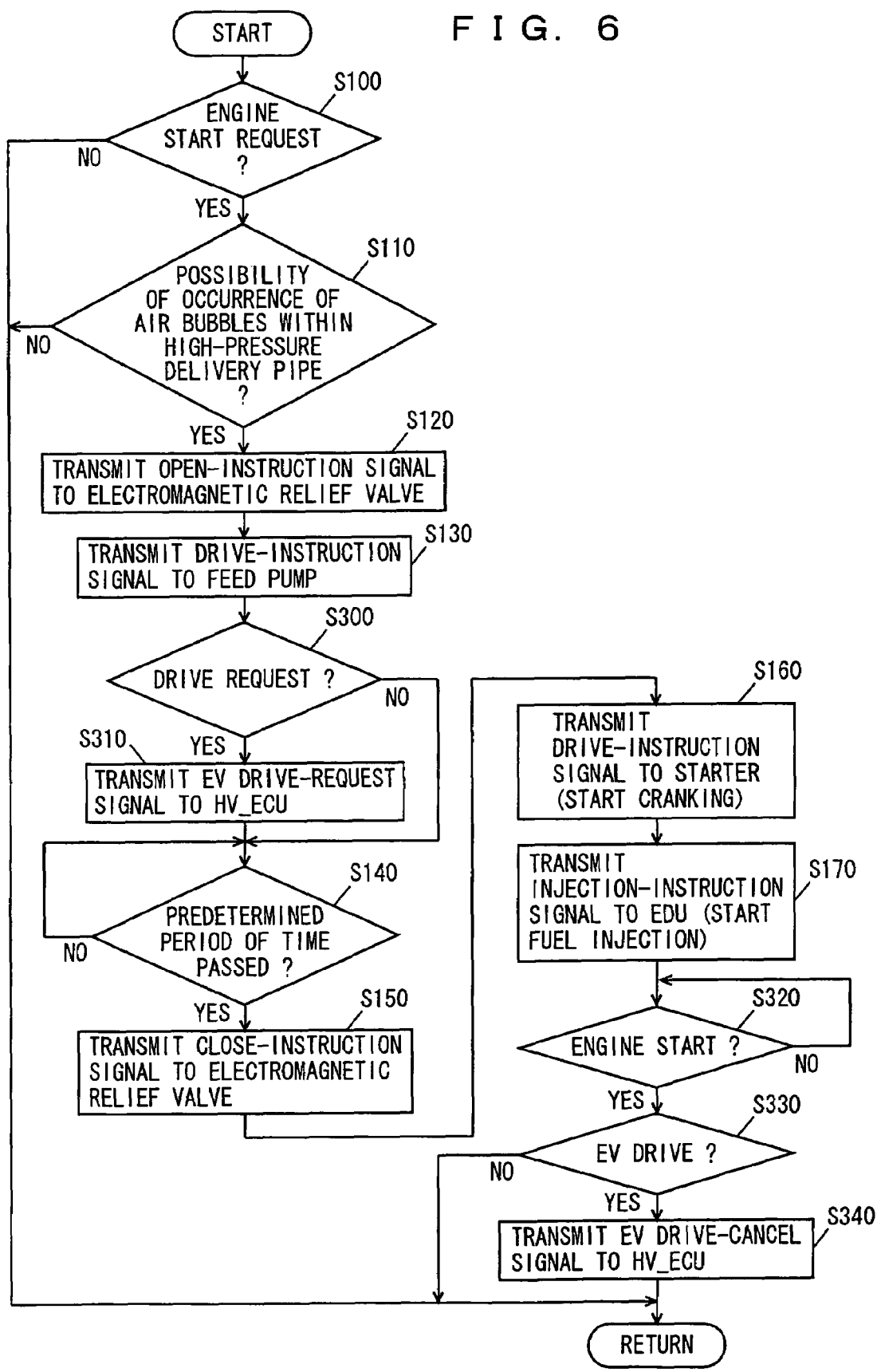
FIG. 6 is a flowchart illustrating a control structure of a program that is executed by the control apparatus according to the third embodiment of the present invention.

Hereinafter, a control structure of a program to be executed by the engine ECU will be described with reference to FIG. 6. The vehicle incorporating this engine ECU is a so-called parallel-type hybrid vehicle, which has the engine and the electric motor that serve as the vehicle driving sources independently from each other. In the flowchart shown in FIG. 6, the processes identical to those in the flowchart in FIG. 4 have the same step numbers allocated, and have the same process contents. Thus, detailed description thereof will not be repeated here.

In S300, the engine ECU determines whether there is a vehicle drive request or not. At this time, when the driver presses down the accelerator pedal, the engine ECU determines that there is a vehicle drive request. If it is determined that there is a vehicle drive request (YES in S300), the process goes to S310. If not (NO in S300), the process goes to S140.

In S310, the engine ECU transmits an EV drive-request signal to an HV_ECU that controls the electric motor for driving. The HV_ECU having received the EV drive-request signal drives the electric motor to cause the vehicle to run if a condition for permitting the EV drive is satisfied. After S310, the process goes to S140.

In S320, the engine ECU determines whether the engine has started or not. At this time, the engine ECU determines that the engine has started if the engine speed increases to the level close to the idle engine speed. If it is determined that the engine has started (YES in S320), the process goes to S330. If not (NO in S320), the process returns to S320, where it awaits the engine start.

In S330, the engine ECU determines whether the vehicle is in the EV drive mode. If it is determined that the vehicle is in the EV drive mode (YES in S330), the process goes to S340. If not (NO in S330), the process is terminated.

In S340, the engine ECU transmits an EV drive-cancel signal to the HV_ECU controlling the electric motor. The HV_ECU having received the EV drive-cancel signal stops the electric motor, and thus, the vehicle is switched to the engine drive mode.

Hereinafter, an operation of the engine controlled by the engine ECU implementing the control apparatus of the present embodiment based on the above-described structure and flowchart will be described. Description of the contents of the operation already described in conjunction with the preceding embodiments will not be repeated here.

In the hybrid vehicle, when the driver turns the ignition switch to the engine start position, or when the HV_ECU transmits to the engine ECU an engine start-instruction signal (instruction signal to restart the engine after the engine is temporarily stopped, in the state where the vehicle is switched between the engine drive mode and the EV drive mode intermittently based on the driver's requests or based on the driving conditions), it is determined that there is an engine start request (YES in S100), and it is then determined whether there is a possibility of occurrence of air bubbles within high-pressure delivery pipe 112 (S110).

If it is determined that there is a possibility of occurrence of air bubbles within high-pressure delivery pipe 112 (YES in S110), a drive-instruction signal is transmitted to feed pump 100 with electromagnetic relief valve 114 opened (S130), so that feed pump 100 is driven for a predetermined period of time. If there is a drive request during this predetermined period of time (YES in S300), an EV drive-request signal is transmitted to the HV_ECU, and the vehicle is driven not by the engine but by the electric motor.

After a lapse of the predetermined period of time, where the air bubbles have disappeared from within high-pressure delivery pipe 112, a drive-instruction signal is transmitted to the starter (S160), and the engine is cranked. The fuel is injected from in-cylinder injector 110, so that the engine is started. After the start of the engine (YES in S320), when the vehicle is in the EV drive mode (YES in S330), the EV drive-cancel signal is transmitted from the engine ECU to the HV_ECU, and the vehicle is switched from the electric motor-driven state to the engine-driven state.

As described above, according to the engine ECU as the control apparatus of the present embodiment, in addition to the effect of the first embodiment, even during the time when the air bubbles within the high-pressure delivery pipe are being transferred to the fuel tank using the feed pump with the electromagnetic relief valve opened before cranking of the engine, the vehicle can be set to the EV drive mode in accordance with the drive request of the driver.

Fourth Embodiment

The engine ECU as the control apparatus according to the present embodiment is characterized in that, when there is a possibility of occurrence of air bubbles within high-pressure delivery pipe 112, electromagnetic relief valve 114 is opened, and the engine is cranked without injecting fuel to actuate first and second high-pressure fuel pumps 200 and 300 for a prescribed period of time, and then fuel injection is started to start the engine, as in the second embodiment described above. The present embodiment differs from the second embodiment in that, when there is a vehicle drive request after an engine start request and before actual start of the engine, EV drive is enabled.

Figure 7:
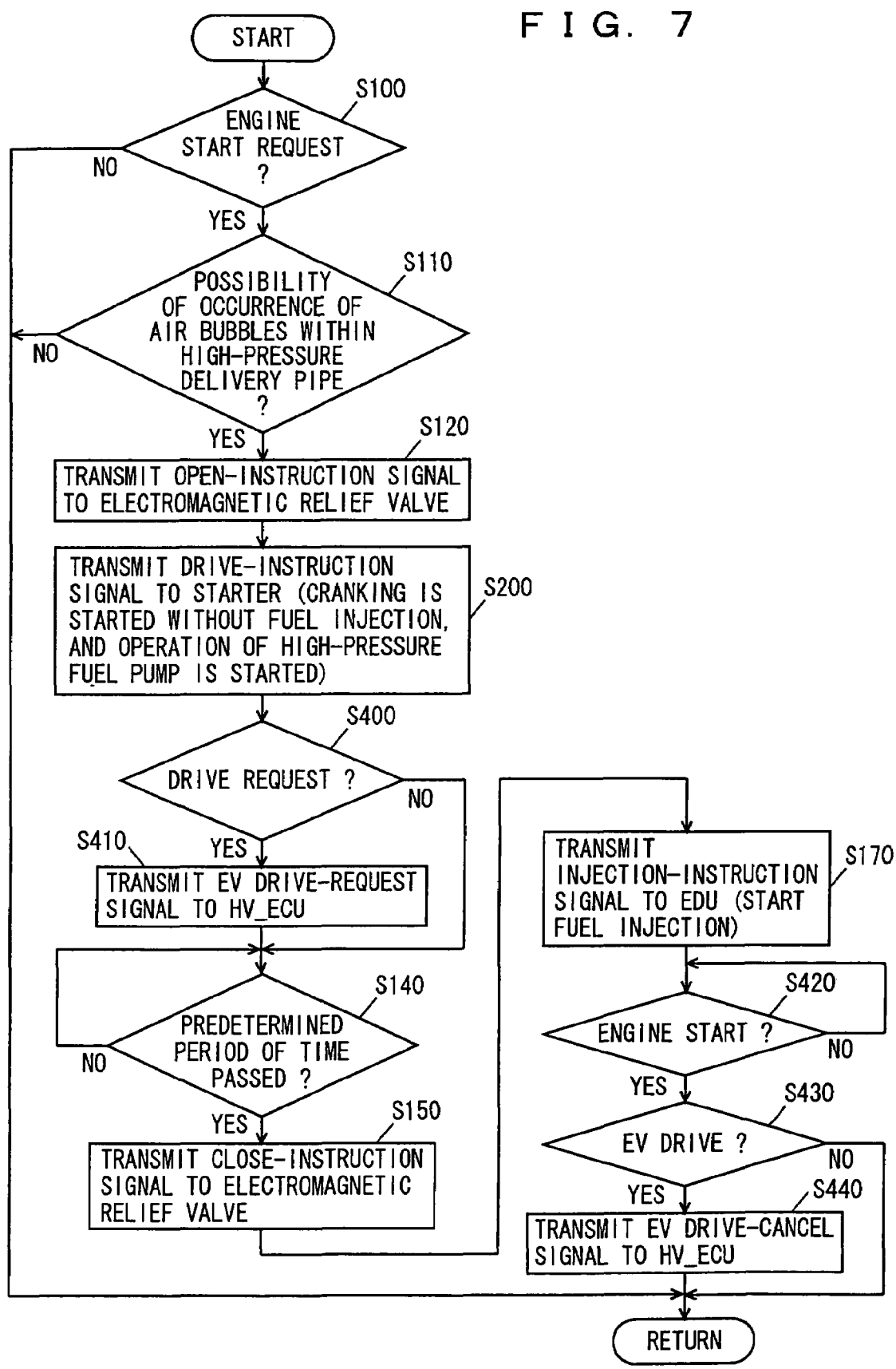
FIG. 7 is a flowchart illustrating a control structure of a program that is executed by the control apparatus according to the fourth embodiment of the present invention.

Hereinafter, a control structure of a program that is executed by the engine ECU will be described with reference to FIG. 7. The vehicle incorporating this engine ECU is a so-called parallel-type hybrid vehicle having the engine and the electric motor as the separate vehicle driving sources, as in the case of the third embodiment described above. In the flowchart shown in FIG. 7, the processes identical to those in the flowchart in FIG. 4 or 5 have the same step numbers allocated and have the same contents. Thus, detailed description thereof will not be repeated here.

In S400, the engine ECU determines whether there is a vehicle drive request or not. At this time, the engine ECU determines that there is the vehicle drive request when the driver presses down the accelerator pedal. If it is determined that there is a vehicle drive request (YES in S400), the process goes to S410. If not (NO in S400), the process goes to S140.

In S410, the engine ECU transmits an EV drive-request signal to the HV_ECU that controls the electric motor for driving. The HV_ECU having received the EV drive-request signal drives the electric motor to run the vehicle, if the condition permitting the EV drive is satisfied. After S410, the process goes to S140.

In S420, the engine ECU determines whether the engine has started or not. At this time, the engine ECU determines that the engine has started when the engine speed increases to a level close to the idle engine speed. If it is determined that the engine has started (YES in S420), the process goes to S430. If not (NO in S420), the process returns to S420, where it awaits the engine start.

In S430, the engine ECU determines whether the vehicle is in the EV drive mode. If so (YES in S430), the process goes to S440. If not (NO in S430), the process is terminated.

In S440, the engine ECU transmits an EV drive-cancel signal to the HV_ECU controlling the electric motor. The HV_ECU having received the EV drive-cancel signal stops the electric motor, and thus, the vehicle is switched to the engine drive mode.

An operation of the engine controlled by the engine ECU identified as the control apparatus according to the present embodiment based on the above-described structure and flowchart will now be described. Description of the contents of the operation already described in conjunction with the preceding embodiments will not be repeated here.

In the hybrid vehicle, when the driver turns the ignition switch to the engine start position, or when the HV_ECU transmits to the engine ECU an engine start-instruction signal (instruction signal to restart the engine after the engine is temporarily stopped, in the state where the vehicle is switched between the engine drive mode and the EV drive mode intermittently based on the driver's requests or based on the driving conditions), it is determined that there is an engine start request (YES in S100), and it is then determined whether there is a possibility of occurrence of air bubbles within high-pressure delivery pipe 112 (S110).

If it is determined that there is a possibility of occurrence of air bubbles within high-pressure delivery pipe 112 (YES in S110), an open-instruction signal is transmitted to electromagnetic relief valve 114 (S120), and electromagnetic relief valve 114 attains an open state. With electromagnetic relief valve 114 opened, a drive-instruction signal is transmitted to the starter (S200), and first and second high-pressure pumps 200 and 300 are driven for a predetermined period of time.

After first and second high-pressure pumps 200 and 300 are driven for the predetermined period of time with electromagnetic relief valve 114 being opened (YES in S140), a close-instruction signal is transmitted to electromagnetic relief valve 114 (S150). After electromagnetic relief valve 114 is closed, the fuel is injected from in-cylinder injector 110 to start the engine. After the engine starts (YES in S420), when the vehicle is in the EV drive mode (YES in S430), the EV drive-cancel signal is transmitted from the engine ECU to the HV_ECU. As such, the vehicle is switched from the electric motor-driven state to the engine-driven state.

As described above, according to the engine ECU as the control apparatus of the present embodiment, in addition to the effect of the second embodiment, even during the time when the air bubbles within the high-pressure delivery pipe are being transferred to the fuel tank using the high-pressure fuel pumps with the electromagnetic relief valve opened before cranking of the engine, the vehicle can be set to the EV drive mode in accordance with the drive request from the driver.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A fuel supply apparatus for an internal combustion engine having a fuel injection mechanism, comprising:
 a high-pressure fuel pump driven by said internal combustion engine and for pressurizing fuel supplied from a fuel tank by a low-pressure fuel pump;
 a delivery pipe for supplying the fuel from said high-pressure fuel pump to said fuel injection mechanism;
 a relief valve that is directly attached to an egress of said delivery pipe and is switched between a communicating state where said delivery pipe is communicated with said fuel tank and a non-communicating state where said delivery pipe is not communicated with said fuel tank; and
 a control portion for controlling said relief valve;
 wherein said control portion
 switches said relief valve to said communicating state at a time of stop of said internal combustion engine, and
 switches said relief valve to said communicating state and drives a fuel pump before fuel injection by said fuel injection mechanism when a predetermined condition for a state in said delivery pipe is satisfied.

2. The fuel supply apparatus for an internal combustion engine according to claim 1, wherein said predetermined condition is that occurrence of vapor within said delivery pipe is expected.

3. The fuel supply apparatus for an internal combustion engine according to claim 2, wherein the occurrence of vapor within said delivery pipe is expected when a temperature of the fuel is high and when said relief valve is switched to said communicating state at the time of stop of said internal combustion engine.

4. The fuel supply apparatus for an internal combustion engine according to claim 2, wherein the occurrence of vapor within said delivery pipe is expected when a temperature of the internal combustion engine is high and when said internal combustion engine is restarted after said relief valve is switched to said communicating state at the time of stop of said internal combustion engine.

5. The fuel supply apparatus for an internal combustion engine according to claim 1, wherein the fuel pump controlled by said control portion is said low-pressure fuel pump.

6. The fuel supply apparatus for an internal combustion engine according to claim 1, wherein the fuel pump controlled by said control portion is said high-pressure fuel pump.

7. The fuel supply apparatus for an internal combustion engine according to claim 1, wherein said internal combustion engine is an internal combustion engine having a fuel injection mechanism for injecting fuel into a cylinder.

8. The fuel supply apparatus for an internal combustion engine according to claim 1, wherein said internal combustion engine is an internal combustion engine having a fuel injection mechanism for injecting fuel into a cylinder and a fuel injection mechanism for injecting fuel into an intake manifold.

9. The fuel supply apparatus for an internal combustion engine according to claim 1, wherein said internal combustion engine is mounted to a vehicle and operated intermittently during driving of said vehicle.

10. The fuel supply apparatus for an internal combustion engine according to claim 9, wherein
said internal combustion engine and a rotary electric machine are mounted to said vehicle as driving sources for driving said vehicle, and
said vehicle is driven by said rotary electric machine when there is a drive request while said control portion is controlling the fuel pump.

11. A fuel supply apparatus for an internal combustion engine having fuel injection means, comprising:
a high-pressure fuel pump driven by said internal combustion engine and for pressurizing fuel supplied from a fuel tank by a low-pressure fuel pump;
a delivery pipe for supplying the fuel from said high-pressure fuel pump to said fuel injection means;
a relief valve that is directly attached to an egress of said delivery pipe and is switched between a communicating state where said delivery pipe is communicated with said fuel tank and a non-communicating state where said delivery pipe is not communicated with said fuel tank; and
control means for controlling said relief valve;
wherein said control means includes
means for switching said relief valve to said communicating state at a time of stop of said internal combustion engine, and
pump control means for switching said relief valve to said communicating state and driving a fuel pump before fuel injection by said fuel injection means when a predetermined condition for a state in said delivery pipe is satisfied.

12. The fuel supply apparatus for an internal combustion engine according to claim 11, wherein said predetermined condition is that occurrence of vapor within said delivery pipe is expected.

13. The fuel supply apparatus for an internal combustion engine according to claim 12, wherein the occurrence of vapor within said delivery pipe is expected when a temperature of the fuel is high and when said relief valve is switched to said communicating state at the time of stop of said internal combustion engine.

14. The fuel supply apparatus for an internal combustion engine according to claim 12, wherein the occurrence of vapor within said delivery pipe is expected when a temperature of the internal combustion engine is high and when said internal combustion engine is restarted after said relief valve is switched to said communicating state at the time of stop of said internal combustion engine.

15. The fuel supply apparatus for an internal combustion engine according to claim 11, wherein the fuel pump controlled by said pump control means is said low-pressure fuel pump.

16. The fuel supply apparatus for an internal combustion engine according to claim 11, wherein the fuel pump controlled by said pump control means is said high-pressure fuel pump.

17. The fuel supply apparatus for an internal combustion engine according to claim 11, wherein said internal combustion engine is an internal combustion engine having fuel injection means for injecting fuel into a cylinder.

18. The fuel supply apparatus for an internal combustion engine according to claim 11, wherein said internal combustion engine is an internal combustion engine having fuel injection means for injecting fuel into a cylinder and fuel injection means for injecting fuel into an intake manifold.

19. The fuel supply apparatus for an internal combustion engine according to claim 11, wherein said internal combustion engine is mounted to a vehicle and operated intermittently during driving of said vehicle.

20. The fuel supply apparatus for an internal combustion engine according to claim 19, wherein
said internal combustion engine and a rotary electric machine are mounted to said vehicle as driving sources for driving said vehicle, and
said vehicle is driven by said rotary electric machine when there is a drive request while said pump control means is controlling the fuel pump.

* * * * *